United States Patent [19]

Watanabe

[11] 4,346,792
[45] Aug. 31, 1982

[54] DISC BRAKE DEVICE

[75] Inventor: Mamoru Watanabe, Tokyo, Japan

[73] Assignee: Watanabe Engineering Kabushiki Kaisha, Tokyo, Japan

[21] Appl. No.: 170,816

[22] Filed: Jul. 17, 1980

[30] Foreign Application Priority Data

Jul. 19, 1979 [JP] Japan .................... 54-100095[U]

[51] Int. Cl.³ .............................................. F16D 65/02
[52] U.S. Cl. ................................................ 188/73.32
[58] Field of Search ............... 188/73.32, 73.33, 73.34, 188/71.1, 73.31

[56] References Cited

U.S. PATENT DOCUMENTS

| | | | |
|---|---|---|---|
| 3,993,170 | 11/1976 | Lessard | 188/73.3 X |
| 4,022,297 | 5/1977 | Haraikawa | 188/73.31 X |
| 4,082,166 | 4/1978 | Ritsena | 188/73.32 |

FOREIGN PATENT DOCUMENTS 1161355  8/1969  United Kingdom ............... 188/71.1

*Primary Examiner*—George E. A. Halvosa
*Attorney, Agent, or Firm*—Armstrong, Nikaido, Marmelstein & Kubovcik

[57] ABSTRACT

A disk brake device disclosed herein comprises a brake caliper having a first and a second clamp arms that bridge over the brake disc, a movable friction pad connected to a pad pushing device disposed on the first clamp arm and opposing one side surface of the brake disc, a fixed friction pad disposed on the internal surface of the secnd clamp arm to oppose the other side surface of the brake disc, the fixed friction pad having a back plate, and a stopper detachably connected to the rear of the back plate. The second clamp arm has a window, which has a shape smaller than the back plate, opening to both internal and external side surfaces thereof, and a plurality of notches formed in opposed inner edges of the window. The back plate has a plurality of notches formed in opposed outer edge thereof, and the stopper has a plurality of first projections in engagement with the notches of the second clamp arm and back plate and a plurality of second projections in contact with the external side surface of the second clamp arm.

5 Claims, 6 Drawing Figures

DISC BRAKE DEVICE

BACKGROUND OF THE INVENTION

1. Field of the Invention

The present invention relates to a disc brake device which is suitable for a vehicle, especially for a small type automotive vehicle such as a motorcycle, a snowmobile and so forth.

2. Description of the Prior Art

The disc brake device of the type as described so far known comprises a brake caliper having a first and a second clamp arms that bridge over the brake disc, a movable friction pad connected to a pad pushing device disposed on the first clamp arm and opposing one side of the brake disc, and a fixed friction pad disposed on the internal surface of the second clamp arm to oppose the other side of the brake disc, the fixed friction pad having a back plate.

In the past, the fixed friction pad has been mounted on the internal surface of the second clamp arm by forming a recess in the internal surface of the second clamp arm, fitting the back plate of the fixed friction pad into the recess, and fixing by means of screws the back plate through a stiffening plate from the outside of the second clamp arm. And, in the event that both the friction pads remain unreturned while urging both sides of the brake disc due to the trouble of the pad pushing device or the like, the fixed friction pad has to be removed. However, in this case, if the brake caliper is of the type in which the first and second clamp arms are fastened by bolts, these bolts must be removed which is troublesome. Further, in the type in which the first and second clamp arms are integrally formed, there is an inconvenience that even if the screws are loosened, the fixed friction pad cannot be removed because the back plate is fitted in the recess in the internal surface of the second clamp arm.

SUMMARY OF THE INVENTION

The present invention has been achieved in view of the foregoing. It is an object of the present invention to provide a disc brake device in which a fixed friction pad can be removed easily.

In accordance with the present invention, there is provided a disc brake device comprising a brake caliper having a first and a second clamp arms that bridge over the brake disc, a movable friction pad connected to a pad pushing device disposed on the first clamp arm and opposing one side of the brake disc, a fixed friction pad disposed on the internal surface of the second clamp arm to oppose the other side of the brake disc, the fixed friction pad having a back plate, and a stopper detachably connected to the rear of the back plate, the second clamp arm having a window, which has a shape smaller than the back plate, opening to both inner and outer sides thereof, and a plurality of notches formed in opposed inner edges of the window, the back plate having a plurality of notches formed in opposed outer edge thereof, the stopper having a plurality of first projections in engagement with the notches of the second clamp arm and back plate and a plurality of second projections in contact with the outer side of the second clamp arm.

The above and other objects, features and advantages of the invention will become apparent from the following detailed description of the invention when taken in conjunction with the accompanying drawings which illustrate a presently preferred embodiment of the invention.

DESCRIPTION OF THE PREFERRED EMBODIMENT

Figure 1:
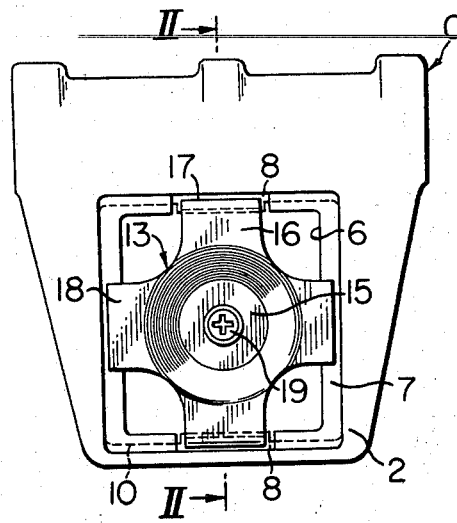
FIG. 1 is a front view showing an embodiment of the device in accordance with the present invention.

Hereinafter, an embodiment of the device of the present invention will be explained by referring to the accompanying drawings. In the drawings, reference symbol D represents a brake disc which rotates along with a wheel (not shown) of a vehicle and symbol C represents a brake caliper supported in a freely slidable manner in the axial direction of the brake disc D by means of a fixing bracket (not shown) secured to the vehicle body. The brake caliper is provided with a first and a second integral clamp arms 1 and 2 that bridge over the outer circumferential portion of the brake disc D from both right and left. A rectangular support hole 3 is formed to open at the internal side surface of the first clamp arm 1, and a rectangular movable friction pad 5, which has a back plate 4 opposing the left side surface of the brake disc D, is slidably fitted into the support hole 3. Also, the second clamp arm 2 is formed with a rectangular window 6 opening at both inner and outer side surfaces thereof, the window 6 having its shape smaller than a back plate 10 of a fixed friction pad which will be described later. The window 6 is formed at its outer peripheral edge with a flat rectangular stepped portion 7, at upper and lower opposed portions of which are formed a pair of notches 8 opening to the window 6.

Figure 3:
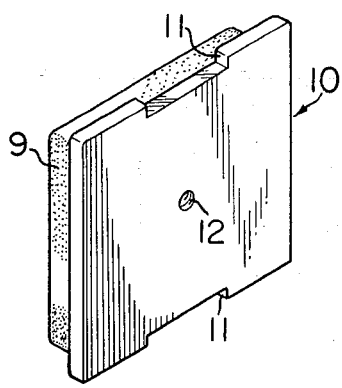
FIG. 3 is a perspective view of a fixed friction pad.

A fixed friction pad 9 is in the form of a rectangle as shown in FIG. 3 and has a back plate 10 in the form of a rectangle having a larger shape than the former. The back plate 10 has a pair of notches 11 formed in upper and lower opposed edges thereof and a tapped hole 12 for receiving a screw formed in a central portion thereof.

Figure 4:
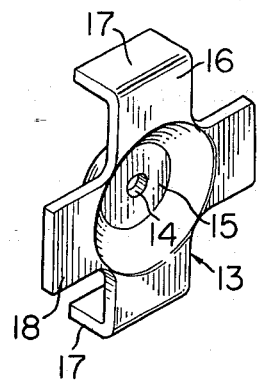
FIG. 4 is a perspective view of a stopper.
Figure 5:
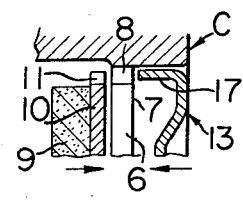
FIG. 5 is a fragmentary sectional view of assistance in explaining the mounting of the fixed friction pad.

A stopper 13 of the fixed friction pad 9 is in the form of a cross provided with a pair of a first projection 16 and a second projection 18 which cross each other as shown in FIG. 4 and has a dish-like recess 15 formed at its central portion with a screw inserting hole 14, the first projection or a vertical portion 16 having opposite ends formed into a bended portion 17, the second projection or a horizontal portion 18 having opposite ends formed into a flat portion.

The fixed friction pad 9 may be mounted by placing the notches 11 of the back plate 10 in coincidence with the notches 8 of the second clamp arm 2 so that the back plate 10 is placed in contact with the internal surface of the second clamp arm 3, fitting the bended portions 17 of the cross-shaped stopper into the notches 8 and 11 of the second clamp arm 2 and the back plate 10, placing both flat ends of the horizontal portion 18 on the stepped portion 7 and placing the outer bottom surface of the dish-like recess 15 on the back plate 10 so that they may be fixed by a screw 19. The fixed friction pad 9 may be positioned and stopped by fitting the bended portions 17 of the cross-shaped stopper 13 into the notches 8 and 11 of the second clamp arm 2 and the back plate 10.

At the time of molding the left clamp arm 1, a female threaded nut member 20 is embedded in such a manner that a screw-threaded hole of this female threaded nut member 20 is open to both the outside surface of the clamp arm 1 and the inner end surface of a mechanism chamber 21 defined at the depth of the abovementioned support hole 3. A male screw threaded member 22 is engaged with this screw-threaded hole when it is rotated from outside and its inner end is projectingly inserted into the mechanism chamber 21. These members 20 and 22 are a right-hand nut and a right-hand screw equipped respectively on their peripheral surfaces with multiple threads of a large lead so that the male screw member 22 is able to produce a relatively large axial displacement with a slight rotational angle. These nut and screw members 20 and 22 form a pad pushing device.

At the outer end of the male screw member 22, there are formed integrally a square shaft 23 and a flange 24 at the base of this square shaft 23. The base part of a brake lever 26, which is actuated by an operation wire 25 and a return spring not shown, is fitted over the square shaft 23. Into the center of the male screw member 22 is fitted a manual adjustment bolt 27 from the outside. The adjustment bolt 27 is provided with a lock nut 28. When the lock nut 28 is fastened to both the square shaft 23 and the brake operating lever 26 via washer 29, the brake operating lever 26, the square shaft 23 and the adjustment bolt 27 can be secured to one another.

The automatic gap adjustment device A, which is to be interposed between the male screw member 22 and the movable friction pad 5 inside the abovementioned mechanism chamber 21, is constructed in the following manner.

Figure 6:
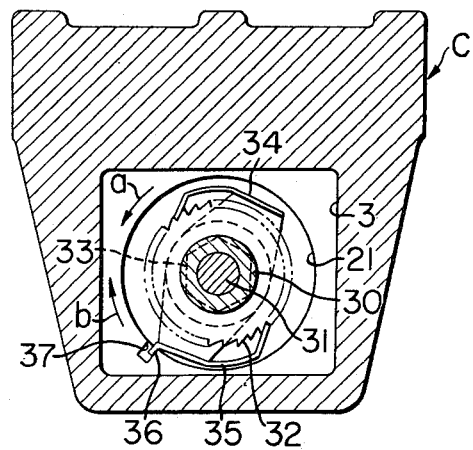
FIG. 6 is a sectional view taken along line VI—VI of FIG. 2.

Namely, the automatic gap adjustment device A consists of a pressure-bearing plate 30 with a screw hole fixed to a back plate 4 of the movable friction pad 5, an adjustment screw 31 having its one end screw-engaged with the screw hole at the center of the pressure-bearing member 30 and the other end slidably and rotatably supported by the center hole of the male screw member 22, a ratchet wheel 32 secured to the center part of this adjustment screw 31, a feed pawl 34 fixed to the square shaft 33 and formed at the inner end of the male screw member 22 for engaging with the ratchet wheel 32, and a return stop pawl 35 rotatably supported by the adjustment screw 31. The return stop pawl 35 is prevented from rotating since a lock plate 36 formed integral with the pawl 35 is engaged with an anchor groove 37 in the internal surface of the mechanism chamber 21, as shown in FIG. 6. Lead of the adjustment screw 31 is much smaller in comparison with that of the male screw member 22 and has a different screw direction from that of the latter 22. The pawl portions of these pawls 34 and 25 are provided with compressive resiliency so as to be automatically engageable with, and disengageable from, the ratchet wheel 32.

In the drawings, reference numeral 38 represents a stopper that determines the limit of backward motion of the brake operating lever.

The operation of this embodiment will now be described. When the male screw member 22 is rotated in the direction of arrow a via the brake operating lever 26 by pulling the operation wire 25, the male screw member 22 undergoes axial displacement via the adjustment bolt 27 so as to press the adjustment screw 31 owing to the mutual engagement between the screw members 20 and 22. Along with the rotation of the screw member 22, the feed pawl 34 rotates to rotate the adjustment screw 31 in the same direction as indicated by the arrow a via the ratchet wheel 32. Thus the adjustment screw 31 rotates, thereby feeding the pressure-bearing member 30 incapable of rotation and hence, the movable friction pad 5, towards the brake disc D. As a result, the sum of the axial displacement of the male screw member 22 and the axial displacement of the pressure-bearing member 30 relative to the adjustment screw 31 becomes the displacement of the movable friction pad 5 towards the brake disc D and this displacement brings the movable friction pad 5 into pressure contact with the left side surface of the brake disc D, whereupon the brake caliper C moves owing to the reaction, in the direction opposite the movable friction pad 5 and brings the fixed friction pad 9 into pressure contact with the right side surface of the brake disc D via the clamp arm 2. In this manner, the brake disc d is applied with a braking force due to the clamping action of both friction pads 5 and 9.

When the operation wire 25 is released so as to overcome this braking, the brake operating lever 10 is rotated in the direction of arrow b by a return spring (not shown) until it is supported onto the stopper 38. This causes the male screw member 22 to move backward in the axial direction while rotating in the direction of arrow b and returns it to its original position. However, since the ratchet wheel 32 is prevented from rotating in the direction indicated by b by the return stop pawl 35, the feed pawl 34 slides over the ratchet wheel 32 and does not prevent the abovementioned rotation of the male screw member 22.

Accordingly, the feed quantity of the pressure-bearing member 30 by means of the adjustment screw 31 during the abovementioned braking process is kept as such. Since the quantity of the backward movement of the movable friction pad 5 corresponds to that of the male screw member 22 in the axial direction, the position of the movable friction pad 5 after the release of the brake is at a position advanced by the feed quantity of the pressure-bearing member 30 by the adjustment screw 31, or, at a position closer to the brake disc D. This displacement of the movable friction pad 5 becomes a compensation quantity for the wear of both friction pads 5, 9 on account of the abovementioned braking.

In this manner, the gap between the brake disc D in the non-braking state and each friction pad 5, 9 is automatically adjusted to the level substantially equal to that prior to braking, and satisfactory braking action can be obtained at the time of subsequent braking on account of a suitable actuation angle of the brake operating lever 26.

When the automatic gap adjustment device A no longer operates normally due to damage of the feed pawl 34, for example, and the gap increases between the friction pads 5, 9 and the braking disc D due to the wear of these members, the lock nut 28 is first loosened and then the manual adjustment bolt 27 is so rotated as to suitably push forward the adjustment screw 31 at its tip, thereby allowing the wear of the friction pads 5, 9 to be compensated. After this adjustment, the lock nut 28 should naturally be returned again to its original tightened state.

Figure 2:
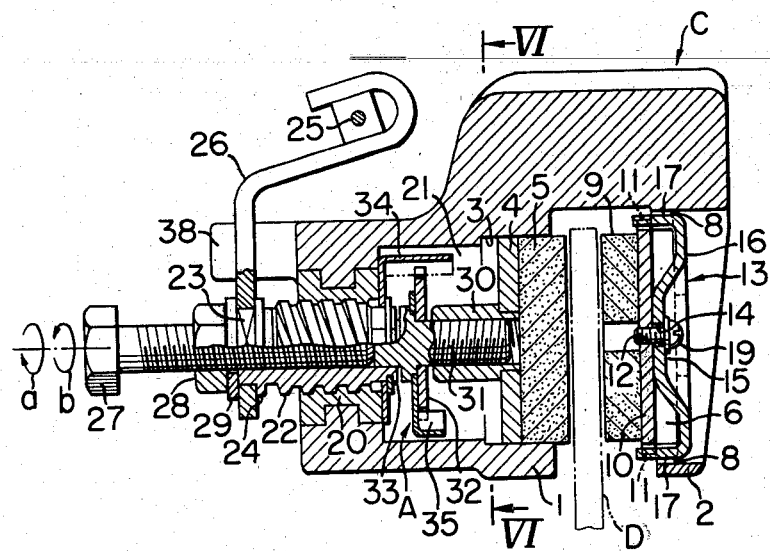
FIG. 2 is a sectional view taken along line II—II of FIG. 1.

In the event that the fixed friction pad 9 remains unreturned while being pushed against the side surface of the disc brake D due to trouble or the like of the pad pushing devices 20, 22 or the automatic gap adjustment device A, the screw 19 of the stopper 13 is loosened to remove the stopper 13, and then the fixed friction pad 9 along with the back plate 10 may be easily removed downwardly in FIG. 2.

As stated above, in the present invention, the fixed friction pad 9 may be removed by the simple operation of removing the stopper 13, the fixed friction pad 9 may be positioned simply and positively when the fixed friction pad is mounted by fitting the first projection 16 of the stopper 13 into both notches 8, 11 of the second clamp arm 2 and back plate 10, and after the mounting, the fixed friction pad 9 may be stopped by the stopper 13.

Although the present invention has been described with reference to a preferred embodiment thereof, it should be noted that the embodiment is illustrative only, and not restrictive, and that any change and modification may be made by those skilled in the art within the spirit and scope of the invention.

What is claimed is:

1. A disc brake device comprising:
   a brake disc;
   a brake caliper having a first and a second clamp arms in straddling relation to said brake disc, said second clamp arm having a window and a plurality of notches formed in opposed inner edges of said window;
   a movable friction pad connected to a pad pushing device in said first clamp arm and opposing one side surface of said brake disc;
   a fixed friction pad disposed on an internal side of said second clamp arm in opposing relation to the other side surface of said brake disc;
   a back plate secured to said fixed friction pad and having a plurality of notches formed in opposed outer edges thereof, said window being smaller in area than said back plate;
   a stopper detachably connected to the rear of said back plate, said stopper having a plurality of first projections in engagement with the notches in said second clamp arm and in said back plate for holding said back plate against rotation relative to said second clamp arm and a plurality of second projections in abutting engagement with the external side surface of said second clamp arm for resiliently holding said back plate with said fixed pad against said second clamp arm.

2. The disc brake device as defined in claim 1 wherein said stopper is connected to the rear of said back plate by screw means.

3. The disc brake device as defined in claim 2 wherein said stopper is formed at its center portion with a dish-like recess depressed towards said back plate, said recess coming into contact with said back plate and being connected thereto by screw means.

4. The disc brake device as defined in claim 1 wherein said stopper is in the form of a cross having a pair of first and second projections crossing each other.

5. The disc brake device as defined in claim 1 wherein a flat stepped portion surrounding said window is formed in the external surface of said second clamp arm, and said first projection is engaged with said stepped portion.

* * * * *